United States Patent
Oono et al.

(10) Patent No.: US 11,769,875 B2
(45) Date of Patent: Sep. 26, 2023

(54) ELECTRODE MATERIAL, METHOD FOR MANUFACTURING ELECTRODE MATERIAL, ELECTRODE, AND LITHIUM ION BATTERY

(71) Applicant: SUMITOMO OSAKA CEMENT CO., LTD., Tokyo (JP)

(72) Inventors: Kouji Oono, Chiba (JP); Satoru Oshitari, Chiba (JP); Tsutomu Nozoe, Chiba (JP); Masataka Oyama, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/559,773

(22) Filed: Sep. 4, 2019

(65) Prior Publication Data

US 2020/0287209 A1    Sep. 10, 2020

(30) Foreign Application Priority Data

Mar. 7, 2019  (JP) ................ 2019-041752

(51) Int. Cl.
| | | |
|---|---|---|
| *H01M 4/38* | (2006.01) | |
| *H01M 4/04* | (2006.01) | |
| *H01M 4/133* | (2010.01) | |
| *H01M 4/23* | (2006.01) | |
| *H01M 10/0525* | (2010.01) | |

(52) U.S. Cl.
CPC ......... *H01M 4/382* (2013.01); *H01M 4/0419* (2013.01); *H01M 4/133* (2013.01); *H01M 4/23* (2013.01); *H01M 10/0525* (2013.01)

(58) Field of Classification Search
CPC .... H01M 4/382; H01M 4/0419; H01M 4/133; H01M 4/23; H01M 10/0525; H01M 4/366; H01M 4/5825; H01M 4/583; H01M 2004/021
See application file for complete search history.

(56) References Cited

U.S. PATENT DOCUMENTS

| | | |
|---|---|---|
| 6,855,273 B2 | 2/2005 | Ravet et al. |
| 2016/0190586 A1 | 6/2016 | Hoshina et al. |
| 2017/0033360 A1 | 2/2017 | Michaud et al. |
| 2018/0277838 A1 | 9/2018 | Yasumiichi et al. |
| 2018/0277846 A1 | 9/2018 | Oono et al. |
| 2018/0287152 A1 | 10/2018 | Yasumiishi et al. |
| 2019/0267623 A1 | 8/2019 | Nozoe et al. |
| 2021/0193994 A1* | 6/2021 | Stevens ................ H01M 4/625 |

FOREIGN PATENT DOCUMENTS

| | | |
|---|---|---|
| CN | 109103433 | 12/2018 |
| EP | 3629404 A1 | 4/2020 |
| JP | 2001-015111 | 1/2001 |
| JP | 2008-311067 A | 12/2008 |
| JP | 2012-195156 | 10/2012 |
| JP | 2017-513793 | 6/2017 |
| JP | 2018-163762 A | 10/2018 |
| JP | 2018-170187 A | 11/2018 |
| JP | 6471821 | 2/2019 |
| WO | 2017/094163 | 6/2017 |

OTHER PUBLICATIONS

Office Action in corresponding EP App. No. 19195344, dated May 4, 2021.

* cited by examiner

*Primary Examiner* — Brittany L Raymond
(74) *Attorney, Agent, or Firm* — GREENBLUM & BERNSTEIN, P.L.C.

(57) ABSTRACT

An electrode material including a carbonaceous-coated electrode active material having primary particles of the electrode active material and secondary particles that are aggregates of the primary particles, and a carbonaceous film that coats the primary particles of the electrode active material and the secondary particles that are the aggregates of the primary particles, in which a specific surface area, which is obtained using a nitrogen adsorption method, is 4 $m^2/g$ or more and 40 $m^2/g$ or less, a volume of micropores per unit mass is 0.05 $cm^3/g$ or more and 0.3 $cm^3/g$ or less, and an average micropore diameter, which is obtained from the volume of the micropores per unit mass and the specific surface area, is 26 nm or more and 90 nm or less.

6 Claims, No Drawings

ELECTRODE MATERIAL, METHOD FOR MANUFACTURING ELECTRODE MATERIAL, ELECTRODE, AND LITHIUM ION BATTERY

CROSS-REFERENCE TO RELATED APPLICATIONS

This application claims the benefit of Japanese Patent Application No. 2019-041752 filed Mar. 7, 2019, the disclosure of which is herein incorporated by reference in its entirety.

BACKGROUND OF THE INVENTION

Field of the Invention

The present invention relates to an electrode material, a method for manufacturing the electrode material, an electrode formed using the electrode material, and a lithium ion battery including a positive electrode made of the electrode.

Description of Related Art

In recent years, as small-sized, lightweight, and high-capacity batteries, non-aqueous electrolyte-based secondary batteries such as lithium ion batteries and the like have been proposed and put into practical use. Lithium ion batteries are constituted of a positive electrode and a negative electrode which have properties capable of reversibly intercalating and deintercalating lithium ions and a non-aqueous electrolyte.

Lithium ion batteries weigh less and have a smaller size and a higher energy than secondary batteries of the related art such as lead batteries, nickel-cadmium rechargeable batteries, nickel metal hydride rechargeable batteries, and the like, are used as power supplies for mobile electronic devices such as mobile phones, notebook-type personal computers, and the like and, in recent years, also have been studied as high-output power supplies for electric vehicles, hybrid vehicles, electric tools, and the like. Electrode active materials for batteries that are used as the above-described high-output power supplies are required to have high-speed charge and discharge characteristics. In addition, studies are also made to apply the electrode active materials for the smoothing of power generation loads or to large-scale batteries such as stationary power supplies, backup power supplies, and the like, and the absence of problems regarding resource amounts as well as long-term safety and reliability is also considered to be important.

Positive electrodes in lithium ion batteries are constituted of an electrode material including a lithium-containing metal oxide having properties capable of reversibly intercalating and deintercalating lithium ions which is called a positive electrode active material, a conductive auxiliary agent, and a binder, and this electrode material is applied onto the surface of a metallic foil which is called a current collector, thereby producing positive electrodes. As the positive electrode active material for lithium ion batteries, generally, lithium cobalt oxide (LiCoO$_2$) is used, and, additionally, lithium (Li) compounds such as lithium nickel oxide (LiNiO$_2$), lithium manganese oxide (LiMn$_2$O$_4$), lithium iron phosphate (LiFePO$_4$), and the like are used. Among these, lithium cobalt oxide and lithium nickel oxide have a problem of the toxicity and resource amounts of elements and a problem such as instability in charged states or the like. In addition, lithium manganese oxide is pointed out to have a problem of being dissolved in electrolytes at high temperatures. Lithium iron phosphate is excellent in terms of long-term safety and reliability, and thus phosphate-based electrode materials having an olivine structure, which are represented by lithium iron phosphate, have been attracting attention in recent years (for example, refer to Japanese Laid-open patent Publication No. 2001-015111).

SUMMARY OF THE INVENTION

The phosphate-based electrode active materials described in Patent Document 1 have insufficient electron conductivity of the material and thus, in order to charge and discharge large electric currents, a variety of means such as the miniaturization of particles, the conjugation with conductive substances, and the like is required, and a lot of efforts are being made.

In addition, electrode materials for lithium ion batteries are used after being turned into paste by adding a material which is generally called as a conductive auxiliary agent such as carbon black or the like, a binder represented by polyvinylidene fluoride, and a solvent thereto and then being applied onto a metallic foil which is called a current collector. In order to use a fine electrode material in the above-described paste form, there have been problems of an increase in the amounts of materials used other than the electrode materials such as the use of a large amount of a solvent in order to adjust the viscosity to be suitable for application, the use of a large amount of a binder in order to ensure the adhesive force to the current collector, and the like, the necessity of time and energy for removing the solvent, and the like.

The present invention has been made in consideration of the above-described circumstances, and an object of the present invention is to provide an electrode material which is capable of realizing coating by a favorable carbonaceous film and can be used to obtain a lithium ion battery which ensures the electrolyte infiltration properties, whereby the direct current resistance can be decreased, the discharge capacity can be increased, and thus the input and output characteristics can be enhanced, a method for manufacturing the electrode material, an electrode formed using the electrode material, and a lithium ion battery including a positive electrode made of the electrode.

The present inventors carried out intensive studies in order to solve the above-described problems and consequently found that, when an electrode material in which an organic substance including sugar and an ionic organic substance are used as a carbon source, a specific surface area, which is obtained using a nitrogen adsorption method, is set to 4 m$^2$/g or more and 40 m$^2$/g or less, a volume of micropores per unit mass is set to 0.05 cm$^3$/g or more and 0.3 cm$^3$/g or less, and an average micropore diameter, which is obtained from the volume of micropores per unit mass and the specific surface area, is set to 26 nm or more and 90 nm or less by adjusting a particle synthesis condition, the kind and amount of the carbon source, a carbonization condition, and the like is produced, fine electrode active material particles which are coated with a favorable carbonaceous film and have favorable electrolyte infiltration properties and favorable electrolyte holding capability are obtained, and the above-described problem can be solved.

The present invention has been completed on the basis of the above-described finding.

That is, the present invention provides [1] to [6] below.

[1] An electrode material including a carbonaceous-coated electrode active material having primary particles of the electrode active material and secondary particles that are aggregates of the primary particles, and a carbonaceous film that coats the primary particles of the electrode active material and the secondary particles that are the aggregates of the primary particles, in which a specific surface area, which is obtained using a nitrogen adsorption method, is 4 m²/g or more and 40 m²/g or less, a volume of micropores having a micropore diameter of 200 nm or less per unit mass, which is obtained using the nitrogen adsorption method, is 0.05 cm³/g or more and 0.3 cm³/g or less, and an average micropore diameter, which is obtained from the volume of the micropores having a micropore diameter of 200 nm or less per unit mass and the specific surface area, is 26 nm or more and 90 nm or less.

[2] The electrode material according to [1], in which the electrode active material is an electrode active material represented by General Formula (1).

$$Li_aA_xM_yBO_z \quad (1)$$

(In the formula, A represents at least one element selected from the group consisting of Mn, Fe, Co, and Ni, M represents at least one element selected from the group consisting of Na, K, Mg, Ca, Al, Ga, Ti, V, Cr, Cu, Zn, Y, Zr, Nb, Mo, and rare earth elements, B represents at least one element selected from the group consisting of B, P, Si, and S, $0 \leq a < 4$, $0 < x < 1.5$, $0 \leq y < 1$, and $0 < z \leq 4$.)

[3] The electrode material according to [2], in which the electrode active material represented by General Formula (1) is an electrode active material represented by General Formula (2).

$$Li_aA_xM_yPO_4 \quad (2)$$

(In the formula, A, M, a, x, and y are as described above.)

[4] A method for manufacturing the electrode material according to any one of [1] to [3], the method including: a first step of drying a slurry obtained by mixing an organic substance including sugar and an ionic organic substance as a carbon source, one or more selected from the electrode active material and an electrode active material precursor, and a solvent by using a spray dryer and granulating the slurry and a second step of thermally treating a granulated substance obtained in the first step in a non-oxidative atmosphere at 600° C. or higher and 1,000° C. or lower.

[5] An electrode formed using the electrode material according to any one of [1] to [3].

[6] A lithium ion battery including: a positive electrode made of the electrode according to [5].

According to the present invention, it is possible to provide an electrode material which can be used to obtain a lithium ion battery capable of decreasing the direct current resistance, increasing the discharge capacity, and thus enhancing the input and output characteristics, a method for manufacturing the electrode material, an electrode formed using the electrode material, and a lithium ion battery including a positive electrode made of the electrode.

DETAILED DESCRIPTION OF THE INVENTION

Electrode Material

An electrode material of the present embodiment includes a carbonaceous-coated electrode active material having primary particles of the electrode active material and secondary particles that are aggregates of the primary particles, and a carbonaceous film that coats the primary particles of the electrode active material and the secondary particles that are the aggregates of the primary particles, a specific surface area, which is obtained using a nitrogen adsorption method, is 4 m²/g or more and 40 m²/g or less, a volume of micropores having a micropore diameter of 200 nm or less per unit mass, which is obtained using the nitrogen adsorption method, is 0.05 cm³/g or more and 0.3 cm³/g or less, and an average micropore diameter, which is obtained from the volume of the micropores having a micropore diameter of 200 nm or less per unit mass and the specific surface area, is 26 nm or more and 90 nm or less.

The electrode active material that is used in the present embodiment is constituted of primary particles and secondary particles that are aggregates of the primary particles. The shape of the electrode active material particle is not particularly limited, but is preferably spherical, particularly, truly spherical. When the electrode active material particle has a spherical shape, internal micropores of a granulated granular body (carbonaceous-coated electrode active material) are likely to be uniform, and a favorable electrolyte holding capability is developed. In addition, when the carbonaceous-coated electrode active material is produced in a granular body form, it is possible to decrease the amount of a solvent used to prepare a paste for forming an electrode using the electrode material of the present embodiment, and it also becomes easy to apply the paste for forming an electrode to a current collector. Meanwhile, the paste for forming an electrode can be prepared by, for example, mixing the electrode material of the present embodiment, a binder resin (binder), and a solvent.

The electrode active material that is used in the electrode material of the present embodiment is preferably an electrode active material represented by General Formula (1) from the viewpoint of a high discharge capacity, a high energy density, safety, and cycle stability.

$$Li_aA_xM_yBO_z \quad (1)$$

(In the formula, A represents at least one element selected from the group consisting of Mn, Fe, Co, and Ni, M represents at least one element selected from the group consisting of Na, K, Mg, Ca, Al, Ga, Ti, V, Cr, Cu, Zn, Y, Zr, Nb, Mo, and rare earth elements, B represents at least one element selected from the group consisting of B, P, Si, and S, $0 \leq a < 4$, $0 < x < 1.5$, $0 \leq y < 1$, and $0 < z \leq 4$.)

In the formula, A is at least one element selected from the group consisting of Mn, Fe, Co, and Ni, and, among these, Mn and Fe are preferred, and Fe is more preferred.

M is at least one element selected from the group consisting of Na, K, Mg, Ca, Al, Ga, Ti, V, Cr, Cu, Zn, Y, Zr, Nb, Mo, and rare earth elements, and, among these, Mg, Ca, Al, and Ti are preferred.

B is at least one element selected from the group consisting of B, P, Si, and S, and, among these, P is preferred from the viewpoint of excellent safety and cycle characteristics.

a is 0 or more and less than 4, preferably 0.5 or more and 3 or less, more preferably 0.5 or more and 2 or less, and particularly preferably 1. x is more than 0 and less than 1.5, preferably 0.5 or more and 1 or less, and, among these, 1 is preferred. y is 0 or more and less than 1 and preferably 0 or more and 0.1 or less. z is more than 0 and 4 or less and is selected depending on the composition of B. For example, in a case in which B is phosphorus (P), z is preferably 4, and, in a case in which B is boron (B), z is preferably 3.

The electrode active material represented by General Formula (1) preferably has an olivine structure, is more preferably an electrode active material represented by General Formula (2), and still more preferably LiFePO₄ or Li(Fe$_{x1}$Mn$_{1-x1}$)PO$_4$ (here 0<x1<1) which is LiFePO$_4$ in which some of Fe is substituted by Mn.

$$Li_aA_xM_yPO_4 \qquad (2)$$

(In the formula, A, M, a, x, and y are as described above.)

As the electrode active material (Li$_a$A$_x$M$_y$BO$_z$) represented by General Formula (1), an electrode active material manufactured using a method of the related art such as a solid-phase method, a liquid-phase method, a gas-phase method, or the like can be used.

Li$_a$A$_x$M$_y$BO$_z$ is obtained by, for example, hydrothermally synthesizing a slurry-form mixture obtained by mixing a Li source, an A source, an M source, a B source, and water and cleaning the obtained precipitate with water. In addition, the same electrode active material is obtained by generating an electrode active material precursor by means of a hydrothermal synthesis and, furthermore, calcinating the electrode active material precursor. A pressure-resistant airtight container is preferably used in the hydrothermal synthesis.

Here, examples of the Li source include lithium salts such as lithium acetate (LiCH$_3$COO), lithium chloride (LiCl), and the like, lithium hydroxide (LiOH), and the like, and at least one selected from the group consisting of lithium acetate, lithium chloride, and lithium hydroxide is preferably used.

Examples of the A source include chlorides, carboxylates, hydrosulfates, and the like which include at least one element selected from the group consisting of Mn, Fe, Co, and Ni. For example, in a case in which the A source is Fe, examples of the Fe source include divalent iron salts such as iron (II) chloride (FeCl$_2$), iron (II) acetate (Fe(CH$_3$COO)$_2$), iron (II) sulfate (FeSO$_4$), and the like, and, among these, at least one selected from the group consisting of iron (II) chloride, iron (II) acetate, and iron (II) sulfate is preferably used.

As the M source, similarly, it is possible to use chlorides, carboxylates, hydrosulfates, and the like of Na, K, Mg, Ca, Al, Ga, Ti, V, Cr, Cu, Zn, Y, Zr, Nb, Mo, and rare earth elements.

Examples of the B source include compounds including at least one element selected from the group consisting of B, P, Si, and S. For example, in a case in which the B source is P, examples of the P source include phosphoric acid compounds such as phosphoric acid (H$_3$PO$_4$), ammonium dihydrogen phosphate (NH$_4$H$_2$PO$_4$), diammonium phosphate ((NH$_4$)$_2$HPO$_4$), and the like, and at least one selected from the group consisting of phosphoric acid, ammonium dihydrogen phosphate, and diammonium phosphate is preferably used.

The substance amount ratio (Li:A:M:B) of the Li source, the A source, the M source, and the B source is appropriately selected so that a desired electrode active material is obtained and impurities are not generated.

The crystallite diameter of the electrode active material is preferably 30 nm or more and 250 nm or less, more preferably 35 nm or more and 250 nm or less, and still more preferably 40 nm or more and 200 nm or less. When the crystallite diameter is 30 nm or more, the amount of carbon necessary to sufficiently coat the electrode active material surface with a carbonaceous film is suppressed, and the amount of the binder can be suppressed, and thus it is possible to increase the amount of the electrode active material in electrodes and increase the capacities of batteries. Similarly, it is possible to prevent the easy occurrence of film peeling caused by the lack of the binding force is also likely to be caused. On the other hand, when the crystallite diameter is 250 nm or less, the internal resistance of the electrode active material is suppressed, and, in a case in which batteries are formed, it is possible to increase the discharge capacities at a high charge-discharge rate.

Meanwhile, the crystallite diameter can be calculated from the Scherrer's equation using the full width at half maximum of the diffraction peak and the diffraction angle (2θ) of the (020) plane in a powder X-ray diffraction pattern that is measured and obtained using an X-ray diffractometer (for example, RINT2000, manufactured by Rigaku Corporation).

The carbonaceous film that coats the primary particles of the electrode active material and the secondary particles that are the aggregates of the primary particles is obtained by carbonizing an organic substance including sugar and an ionic organic substance which serve as a raw material of the carbonaceous film.

As the sugar, glucose, fructose, galactose, mannose, maltose, sucrose, lactose, cellulose, starch, gelatin, carboxymethyl cellulose, methylcellulose, hydroxymethylcellulose, hydroxyethylcellulose, glycogen, pectin, alginic acid, glucomannan, chitin, hyaluronic acid, chondroitin, agarose, and the like are exemplified. Only one sugar may be used or two or more sugars may be used in a mixture form.

As the ionic organic substance (except for sugar), polyacrylic acid, polystyrene sulfonic acid, polycarboxylic acid polymers, alkyl benzene sulfonates, alkyl sulfates, salts of carboxylic acid-modified polyvinyl alcohol, salts of sulfonic acid-modified polyvinyl alcohol, polycarboxylates, polyacrylates, polymethacrylates, ionic surfactants, and the like are exemplified. Only one ionic organic substance may be used or two or more ionic organic substances may be used in a mixture form.

As the organic substance, an organic substance other than sugar and the ionic organic substance can also be added thereto and used, and the organic substance other than sugar and the ionic organic substance is not particularly limited as long as the organic substance is a compound capable of forming a carbonaceous film on the surface of the electrode active material, and, for example, polyvinyl alcohol (PVA), polyvinylpyrrolidone, polyacrylamide, polyvinyl acetate, polyether, dihydric alcohols, trihydric alcohols, nonionic surfactants, and the like can be preferably used.

Only one organic substance other than sugar and the ionic organic substance may be used or two or more organic substances may be used in a mixture form.

The organic substance being used is preferably solvent-soluble in order to facilitate the mixing of the organic substance and the electrode active material particles and obtain a uniform coating of a carbonaceous film and more preferably water-soluble from the viewpoint of easiness in handling, safety, price, and the like.

The average particle diameter of the primary particles of the electrode active material coated with the carbonaceous film (carbonaceous-coated electrode active material) is preferably 30 nm or more and 250 nm or less, more preferably 50 nm or more and 200 nm or less, still more preferably 50 nm or more and 150 nm or less, and far still more preferably 60 nm or more and 100 nm or less. When the average particle diameter is 30 nm or more, it is possible to decrease the amount of the binder necessary for the production of electrodes and increase the capacities of batteries by increasing the amount of the electrode active material in electrodes. In addition, it is possible to suppress film peeling caused by the lack of the binding force. On the other hand, when the average particle diameter is 250 nm or less, it is possible to obtain sufficient high-speed charge and discharge performance.

Here, the average particle diameter of the primary particles refers to the number-average particle diameter. The average particle diameter of the primary particles can be obtained by number-averaging the particle diameters of 200 or more particles measured by scanning electron microscope (SEM) observation.

The average particle diameter of the secondary particles of the carbonaceous-coated electrode active material is preferably 0.5 μm or more and 200 μm or less, more preferably 1 μm or more and 150 μm or less, and still more preferably 3 μm or more and 100 μm or less. When the average particle diameter of the secondary particles is 0.5 μm or more, it is possible to suppress an increase in the amount of the conductive auxiliary agent and the binder necessary to prepare electrode material paste by mixing the electrode material, the conductive auxiliary agent, the binder resin (binder), and the solvent. Therefore, it is possible to increase the battery capacities of lithium ion batteries. On the other hand, when the average particle diameter is 200 μm or less, it is possible to increase the discharge capacities of lithium ion batteries in high-speed charge and discharge.

Here, the average particle diameter of the secondary particles refers to the volume-average particle diameter. The average particle diameter of the secondary particles can be measured using a laser diffraction and scattering-type particle size distribution analyzer or the like.

The thickness (average value) of the carbonaceous film that coats the electrode active material particles is preferably 0.5 nm or more and 6 nm or less, more preferably 0.8 nm or more and 5 nm or less, and still more preferably 0.8 nm or more and 3 nm or less. When the thickness of the carbonaceous film is 0.5 nm or more, it is possible to suppress an increase in the total of the migration resistances of electrons in the carbonaceous film. Therefore, it is possible to suppress an increase in the internal resistance of lithium ion batteries and prevent voltage drop at a high charge-discharge rate. On the other hand, when the thickness is 6 nm or less, it is possible to suppress the formation of steric barrier that hinders the diffusion of lithium ions in the carbonaceous film, and thus the migration resistance of lithium ions decreases. As a result, an increase in the internal resistance of batteries is suppressed, and it is possible to prevent voltage drop at a high charge-discharge rate.

Meanwhile, the thickness of the carbonaceous film can be obtained by capturing the carbonaceous-coated electrode active material using a transmission electron microscope (TEM) or a scanning electron microscope (SEM), measuring the thickness of the carbonaceous film at 100 places from the obtained image of the cross section, and calculating the average value.

The coating ratio of the carbonaceous film to the electrode active material particles is preferably 60% or more and more preferably 80% or more. When the coating ratio of the carbonaceous film is 60% or more, the coating effect of the carbonaceous film can be sufficiently obtained.

Meanwhile, the coating ratio of the carbonaceous film can be obtained by observing the carbonaceous-coated electrode active material using a transmission electron microscope (TEM), an energy dispersive X-ray microanalyzer (EDX), or the like, calculating the proportions of a covered portion in the electrode active material surface, and calculating the average value.

The density of the carbonaceous film is preferably 0.2 g/cm$^3$ or more and 2 g/cm$^3$ or less and more preferably 0.5 g/cm$^3$ or more and 1.5 g/cm$^3$ or less. The density of the carbonaceous film refers to the mass per unit volume of the carbonaceous film.

When the density of the carbonaceous film is 0.2 g/cm$^3$ or more, the carbonaceous film exhibits sufficient electron conductivity. On the other hand, when the density of the carbonaceous film is 2 g/cm$^3$ or less, the amount of the crystals of graphite having a lamellar structure in the carbonaceous film is small, and thus the steric barrier by the fine crystals of graphite is not caused when lithium ions diffuse in the carbonaceous film. Therefore, there is no case in which the lithium ion migration resistance increases.

As a result, there is no case in which the internal resistance of lithium ion batteries increases, and voltage drop does not occur at a high charge-discharge rate of lithium ion batteries.

The amount of carbon in the electrode material (the content of carbon included in the electrode material) of the present embodiment is preferably 0.5% by mass or more and 3.5% by mass or less, more preferably 0.8% by mass or more and 2.5% by mass or less, and still more preferably 0.8% by mass or more and 2.0% by mass or less. When the amount of carbon is 0.5% by mass or more, it is impossible to sufficiently increase the electron conductivity. Meanwhile, when the amount of carbon is 3.5% by mass or less, it is possible to increase the electrode density.

Meanwhile, the amount of carbon can be measured using a carbon analyzer (for example, manufactured by Horiba Ltd., carbon/sulfur analyzer: EMIA-810W).

In the electrode material of the present embodiment, the specific surface area, which is obtained using a nitrogen adsorption method, is 4 m$^2$/g or more and 40 m$^2$/g or less, the volume of micropores having a micropore diameter of 200 nm or less per unit mass, which is obtained using the nitrogen adsorption method, is 0.05 cm$^3$/g or more and 0.3 cm$^3$/g or less, and the average micropore diameter (4V/A), which is obtained from the volume of the micropores (V) having a micropore diameter of 200 nm or less per unit mass and the specific surface area (A), is 26 nm or more and 90 nm or less.

When the average micropore diameter is less than 26 nm, there is a concern that it may not be possible to ensure sufficient electrolyte infiltration properties and the electrolyte holding capability. On the other hand, when the average micropore diameter is more than 90 nm, the density is decreased when an electrode is produced using the electrode material, and the battery capacity per unit volume decreases.

The average micropore diameter (4V/A) is preferably 28 nm or more and 60 nm or less and more preferably 30 nm or more and 55 nm or less from the viewpoint of ensuring sufficient electrolyte infiltration properties and the electrolyte holding capability, improving the density when an electrode is produced using the electrode material, and improving the battery capacity per unit volume.

Meanwhile, the average micropore diameter of the electrode material can be obtained by measuring the micropore diameter distribution of the electrode material by a nitrogen adsorption method (B. J. H. method) using a gas adsorption measurement instrument (for example, manufactured by MicrotracBEL Corp., trade name: BELSORP-II) and calculating the average micropore diameter from the volume of the micropores (V) unit mass and the specific surface area (A).

The V is preferably 0.1 cm$^3$/g or more and 0.3 cm$^3$/g or less and more preferably 0.12 cm$^3$/g or more and 0.25 cm$^3$/g or less. When V is 0.1 cm$^3$/g or more, the electrolyte infiltration properties are sufficiently ensured. Meanwhile, when V is 0.3 cm$^3$/g or less, it is possible to suppress a decrease in the electrode density.

The specific surface area (A) of the electrode material of the present embodiment is 4 m²/g or more and 40 m²/g or less, preferably 10 m²/g or more and 28 m²/g or less, and more preferably 14 m²/g or more and 27 m²/g or less. When the specific surface area is 4 m²/g or more, it is possible to develop sufficient high-speed charge and discharge performance. Meanwhile, when the specific surface area is 40 m²/g or less, it is possible to constitute an electrode without including a large amount of a binder and a conductive auxiliary agent, and thus a decrease in the volume of the battery can be suppressed.

Meanwhile, the specific surface area can be measured by a nitrogen ($N_2$) adsorption method using a gas adsorption measurement instrument (for example, manufactured by MicrotracBEL Corp., trade name: BELSORP-II).

Method for Manufacturing Electrode Material

A method for manufacturing an electrode material according to the present embodiment has a first step of drying a slurry obtained by mixing an organic substance including sugar and an ionic organic substance as a carbon source, one or more selected from the electrode active material and an electrode active material precursor, and a solvent by using a spray dryer and granulating the slurry and a second step of thermally treating a granulated substance obtained in the first step in a non-oxidative atmosphere at 600° C. or higher and 1,000° C. or lower.

First Step

The present step is a step of drying a slurry obtained by mixing an organic substance including sugar and an ionic organic substance as a carbon source, one or more selected from the electrode active material and an electrode active material precursor, and a solvent by using a spray dryer and granulating the slurry.

As the sugar, the organic substance other than the sugar, the electrode active material, and/or the electrode active material precursor, it is possible to respectively use those described in the [electrode material] section.

A slurry for which an organic substance including sugar and an ionic organic substance are used as a carbon source and one or more selected from an electrode active material and an electrode active material precursor and a solvent are mixed together is dried, granulated, and thermally treated, thereby forming a carbonaceous film. The synthesis condition of the electrode material, the carbon source, and the thermal treatment condition are adjusted, thereby obtaining an electrode material having appropriate micropores with a specific surface area, which is obtained using a nitrogen adsorption method, being 4 m²/g or more and 40 m²/g or less, a volume of micropores having a micropore diameter of 200 nm or less per unit mass being 0.05 cm³/g or more and 0.3 cm³/g or less, and an average micropore diameter (4×V/A), which is obtained from the volume of micropores having a micropore diameter of 200 nm or less (V) per unit mass and the specific surface area (A), being 26 nm or more and 90 nm or less. In the above-described manner, it is possible to obtain fine electrode active material particles which are coated with a favorable carbonaceous film and are excellent in terms of the electrolyte infiltration properties and the electrolyte holding capability.

In the first step, the specific surface area of the electrode material can be set to 4 m²/g or more and 40 m²/g or less by adjusting the specific surface area of the electrode active material being used and the amount of the carbon source. As a method for setting the specific surface area of the active material in a desired range, a well-known method of the related art such as the adjustment of the concentration, the temperature, and the like during hydrothermal synthesis and the adjustment of the temperature, the time, and the like during solid-phase synthesis may be used.

In the first step, the granulation and drying temperature is set in a range described below, and the condition such as the concentration of the slurry or the like is adjusted, whereby it is possible to set the volume of micropores having a micropore diameter of 200 nm or less of the electrode material per unit mass is set to 0.05 cm³/g or more and 0.3 cm³/g or less.

In the first step, similarly, the average micropore diameter (4×V/A) of the electrode material is set to 26 nm or more and 90 nm or less.

As described above, it is possible to obtain an electrode material which is easily turned into paste, is excellent in terms of coatability, has an appropriate electrolyte infiltration capability and appropriate electrolyte holding capability during the operation of a battery after the production of an electrode, has a low direct current resistance, and has a high discharge capacity and high input and output characteristics.

First, an organic substance and one or more selected from an electrode active material and an electrode active material precursor are dissolved or dispersed in a solvent, thereby preparing a mixture. A method for dissolving or dispersing an organic substance and one or more selected from an electrode active material and an electrode active material precursor in a solvent is not particularly limited, and, for example, a dispersion apparatus such as a planetary ball mill, a beads mill, a paint shaker, an attritor, or the like can be used.

Examples of the solvent include water; alcohols such as methanol, ethanol, 1-propanol, 2-propanol (isopropyl alcohol: IPA), butanol, pentanol, hexanol, octanol, diacetone alcohol, and the like; esters such as ethyl acetate, butyl acetate, ethyl lactate, propylene glycol monomethyl ether acetate, propylene glycol monoethyl ether acetate, γ-butyrolactone, and the like; ethers such as diethyl ether, ethylene glycol monomethyl ether (methyl cellosolve), ethylene glycol monoethyl ether (ethyl cellosolve), ethylene glycolmonobutyl ether (butyl cellosolve), diethylene glycol monomethyl ether, diethylene glycol monoethyl ether, and the like; ketones such as acetone, methyl ethyl ketone (MEK), methyl isobutyl ketone (MIBK), acetylacetone, cyclohexanone, and the like; amides such as dimethyl formamide, N,N-dimethylacetoacetamide, N-methylpyrrolidone, and the like; glycols such as ethylene glycol, diethylene glycol, propylene glycol, and the like; and the like. These solvents may be used singly, or two or more solvents may be used in mixture. Among these solvents, a preferred solvent is water.

A dispersant may be added thereto as necessary.

The blending ratio between the organic substance and one or more selected from the electrode active material and the electrode active material precursor is preferably 0.5 parts by mass or more and 10 part by mass or less in terms of the mass of carbon obtained from the organic substance with respect to 100 parts by mass of an active material that is obtained from one or more selected from the electrode active material and the electrode active material precursor. The actual blending amount varies depending on the carbonization amount (the kind, carbonization conditions, or the like of the carbon source) by means of heating carbonization and is approximately 1 part by mass to 8 parts by mass.

In addition, when the organic substance and one or more selected from the electrode active material and the electrode active material precursor are dissolved and dispersed in a solvent, it is preferable to disperse one or more selected from the electrode active material and the electrode active material precursor in the solvent and then add and stir the organic substance.

Next, the obtained slurry is dried and granulated using a spray dryer, whereby a granulated substance can be obtained.

Second Step

The present step is a step of thermally treating the granulated substance obtained in the first step in a non-oxidative atmosphere at 600° C. or higher and 1,000° C. or lower.

The non-oxidative atmosphere is preferably an inert atmosphere of nitrogen ($N_2$), argon (Ar), or the like, and, in a case in which it is necessary to further suppress oxidation, a reducing atmosphere including approximately several percentages by volume of a reducing gas such as hydrogen ($H_2$) or the like is preferred. In addition, for the purpose of removing organic components evaporated in the non-oxidative atmosphere during the thermal treatment, a susceptible or burnable gas such as oxygen ($O_2$) or the like may be introduced into the inert atmosphere.

The thermal treatment is carried out at a temperature in a range of 600° C. or higher and 1,000° C. or lower, preferably 650° C. or higher and 900° C. or lower, more preferably 700° C. or higher and 850° C. or lower, and still more preferably 700° C. or higher and 800° C. or lower for 1 to 24 hours, preferably 1 to 10 hours, more preferably 1 to 6 hours, and still more preferably 1 to 3 hours.

When the thermal treatment temperature is lower than 600° C., the carbonization of the organic substance becomes insufficient, and there is a concern that it may be impossible to increase electron conductivity, and, when the thermal treatment temperature is higher than 1,000° C., there is a concern that the electrode active material particles may be decomposed or the suppression of particle growth may be impossible.

According to the manufacturing method of the present embodiment, the organic substance is used as the precursor of the carbonaceous film, and thus the coatability enhances. Therefore, it is possible to suppress the electrode active material particles coming close to one another, and thus it is possible to easily obtain fine and highly reactive electrode materials coated with a carbonaceous film having higher electron conductivity which do not excessively include carbon, and, additionally, it is possible to produce granulated bodies which are excellent in terms of the electrolyte infiltration properties and the electrolyte holding capability and have an appropriate pore size distribution. Electrode materials obtained in the above-described manner are capable of increasing electrode densities, increase discharge capacities at a high charge-discharge rate in a case in which batteries are formed, and enable charging and discharging at a high rate.

In addition, the electrode material of the present embodiment has a large specific surface area and a small particle diameter, and thus favorable responsiveness is exhibited even in charge migration reactions on the surfaces of the electrode active material particles and reactions at a low temperature in which ion diffusivity degrades in the electrode active material particles.

The manufacturing method of the present embodiment is applicable regardless of the kind of the electrode active material and is particularly effective as a method for manufacturing olivine-type phosphate-based electrode materials having low electron conductivity due to the low costs and low environmental loads.

Electrode

An electrode of the present embodiment is formed of the electrode material of the present embodiment.

In order to produce the electrode of the present embodiment, the above-described electrode material, a binder made of a binder resin, and a solvent are mixed together, thereby preparing paint for forming an electrode or paste for forming an electrode. At this time, a conductive auxiliary agent such as carbon black, acetylene black, graphite, ketjen black, natural graphite, artificial graphite, or the like may be added thereto as necessary.

As the binder, that is, the binder resin, for example, a polytetrafluoroethylene (PTFE) resin, a polyvinylidene fluoride (PVdF) resin, fluorine rubber, or the like is preferably used.

The blending ratio between the electrode material and the binder resin is not particularly limited; however, for example, the content of the binder resin is set to 1 part by mass or more and 30 parts by mass or less and preferably set to 3 parts by mass or more and 20 parts by mass or less with respect to 100 parts by mass of the electrode material.

The solvent that is used for the paint for forming an electrode or the paste for forming an electrode may be appropriately selected in accordance with the properties of the binder resin.

Examples thereof include water, alcohols such as methanol, ethanol, 1-propanol, 2-propanol (isopropyl alcohol: IPA), butanol, pentanol, hexanol, octanol, diacetone alcohol, and the like, esters such as ethyl acetate, butyl acetate, ethyl lactate, propylene glycol monomethyl ether acetate, propylene glycol monoethyl ether acetate, γ-butyrolactone, and the like, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, diethylene glycol monoethyl ether, and the like, ketones such as acetone, methyl ethyl ketone (MEK), methyl isobutyl ketone (MIBK), acetylacetone, cyclohexanone, and the like, amides such as dimethyl formamide, N,N-dimethylacetoacetamide, N-methylpyrrolidone (NMP), and the like, glycols such as ethylene glycol, diethylene glycol, propylene glycol, and the like, and the like. These solvents may be used singly, or a mixture of two or more solvents may be used.

Next, the paint for forming an electrode or the paste for forming an electrode is applied onto one surface of a metallic foil and is then dried, thereby obtaining a metallic foil having a coated film made of a mixture of the electrode material and the binder resin formed on one surface.

Next, the coated film is pressed under pressure and dried, thereby producing a current collector (electrode) having an electrode material layer on one surface of the metallic foil.

In the above-described manner, direct current resistance is decreased, and it is possible to produce electrodes capable of increasing discharge capacities and input and output characteristics.

Lithium Ion Battery

A lithium ion battery of the present embodiment includes a positive electrode made of the electrode of the present embodiment. Therefore, the lithium ion battery of the present embodiment decreases the direct current resistance and has a high discharge capacity and high input and output characteristics.

In the lithium ion battery of the present embodiment, a negative electrode, an electrolyte, a separator, and the like are not particularly limited. For example, as the negative electrode, it is possible to use a negative electrode material such as metallic Li, a carbon material, a Li alloy, or $Li_4Ti_5O_{12}$, or the like. In addition, instead of the electrolyte and the separator, a solid electrolyte may be used.

EXAMPLES

Hereinafter, the present invention will be specifically described using examples and comparative examples. Meanwhile, the present invention is not limited to forms described in the examples.

For example, in the present examples, acetylene black is used as a conductive auxiliary agent, but a carbon material such as carbon black, graphite, Ketjen black, natural graphite, artificial graphite, or the like may also be used. In addition, batteries in which natural graphite is used as a counter electrode will be evaluated, but it is needless to say that other carbon materials such as artificial graphite and coke, metallic negative electrodes such as metallic Li, Li alloys, and the like, and oxide-based negative electrode materials such as $Li_4Ti_5O_{12}$ may also be used. In addition, as a non-aqueous electrolyte (a solution of a non-aqueous electrolyte), an electrolyte which includes 1 mol/L of $LiPF_6$ and is produced by mixing ethylene carbonate and ethyl methyl carbonate 3:7 in terms of % by volume, but an electrolyte in which $LiBF_4$, $LiClO_4$, or the like is used instead of $LiPF_6$; an electrolyte in which propylene carbonate, diethyl carbonate, or the like is used instead of ethylene carbonate may be used. In addition, instead of the electrolyte and the separator, a solid electrolyte may be used.

Manufacturing Example 1: Manufacturing of Electrode Active Material ($LiFePO_4$: [1])

$LiFePO_4$ was hydrothermally synthesized in the following manner.

LiOH as a Li source, $NH_4H_2PO_4$ as a P source (B source), and $FeSO_4·7H_2O$ as a Fe source (A source) were used and were mixed into pure water so that the substance amount ratio (Li/Fe/P) therebetween reached 3:1:1, thereby preparing a homogeneous slurry-form mixture (200 mL).

Next, this mixture was put into a pressure-resistant airtight container having a capacity of 500 mL and was hydrothermally synthesized at 170° C. for 12 hours. After this reaction, the mixture was cooled to room temperature (25° C.), thereby obtaining a cake-form reaction product which was precipitated in the container. This precipitate was sufficiently cleaned a plurality of times with distilled water, and the water content ratio was maintained at 30% so as to prevent the precipitate from being dried, thereby producing a cake-form substance. A slight amount of this cake-form substance was sampled, powder obtained by drying the cake-form substance in a vacuum at 70° C. for two hours was measured using an X-ray diffractometer (product name: RINT2000, manufactured by Rigaku Corporation), and it was confirmed that single-phase $LiFePO_4$ was formed.

Manufacturing Example 2: Manufacturing of Electrode Active Material ($LiFePO_4$: [2])

A $LiFePO_4$ electrode active material [2] was obtained in the same manner as in Manufacturing Example 1 except for the fact that the reaction temperature and the reaction time were set to 190° C. and 12 hours.

Manufacturing Example 3: Manufacturing of Electrode Active Material ($LiMnPO_4$)

$LiMnPO_4$ was synthesized in the same manner as in Manufacturing Example 1 except for the fact that $MnSO_4·H_2O$ was used instead of $FeSO_4·7H_2O$ as the Fe source and the reaction was a hydrothermal synthesis at 150° C. for 12 hours.

Manufacturing Example 4: Manufacturing of Electrode Active Material ($Li[Fe_{0.25}Mn_{0.75}]PO_4$)

$Li[Fe_{0.25}Mn_{0.75}]PO_4$ was synthesized in the same manner as in Manufacturing Example 4 except for the fact that a mixture of $FeSO_4·7H_2O$ and $MnSO_4·H_2O$ (at a substance amount ratio of 25:75) was used as the Fe source.

Example 1

$LiFePO_4$ (electrode active material [1]) (20 g) obtained in Manufacturing Example 1, glucose (0.4 g) as a carbon source, and ammonium dodecylbenzenesulfonate (1 g) were mixed into water and crushed and mixed using a ball mill together with zirconia balls (150 g) having 5 mmφ, thereby obtaining a slurry (mixture).

Next, the obtained slurry was dried and granulated using a two-fluid nozzle-type spray dryer. After that, the obtained granulated substance was thermally treated at a temperature of 720° C. for 2.5 hours, thereby obtaining an electrode material made of a carbonaceous-coated electrode active material.

Example 2

An electrode material was obtained in the same manner as in Example 1 except for the fact that a mixture obtained by adding lactose (0.5 g) to a carboxylic acid-modified polyvinyl alcohol (manufactured by Kuraray Co., Ltd., trade name: KL-318, 1.2 g) in which a carboxylic group was neutralized with ammonia was used as the carbon source.

Example 3

An electrode material was obtained in the same manner as in Example 1 except for the fact that an ammonium carboxylate-based surfactant (manufactured by Toagosei Co., Ltd., trade name: ARON A-6114, 1.2 g) and glucose (0.4 g) were additionally used as the carbon source.

Example 4

An electrode material was obtained in the same manner as in Example 1 except for the fact that $LiFePO_4$ (electrode active material [2]) obtained in Manufacturing Example 2 was used.

Example 5

$LiMnPO_4$ (electrode active material) (19 g) obtained in Manufacturing Example 3, a Li carbonate-iron (II) acetate-phosphoric acid (Li:Fe:P=1:1:1)-mixed solution (equivalent to 1 g of $LiFePO_4$) as a carbonization catalyst, ammonium dodecylbenzenesulfonate (2.5 g) as a carbon source, and glucose (0.8 g) were mixed into water and crushed and mixed using a ball mill together with zirconia balls (150 g) having 5 mm, thereby obtaining a slurry (mixture).

Next, the obtained slurry was dried and granulated using a two-fluid nozzle-type spray dryer. After that, the obtained granulated substance was thermally treated at a temperature of 750° C. for four hours, thereby obtaining an electrode material made of a carbonaceous-coated electrode active material.

Example 6

Li[Fe$_{0.25}$Mn$_{0.75}$]PO$_4$ (electrode active material) (20 g) obtained in Manufacturing Example 4 and, as a carbon source, lactose (0.6 g) and carboxylic acid-modified polyvinyl alcohol (manufactured by Kuraray Co., Ltd., trade name: KL-318, 1.2 g) were mixed into water, and the mixture was neutralized using ammonia water so that the neutralization ratio of a carboxyl group of the carboxylic acid-modified polyvinyl alcohol reached 100 mol %. After that, the components were crushed and mixed using a ball mill together with zirconia balls (150 g) having 5 mm$\phi$, thereby obtaining a slurry (mixture).

Next, the obtained slurry was dried and granulated using a two-fluid nozzle-type spray dryer. After that, the obtained granulated substance was thermally treated at a temperature of 750° C. for four hours, thereby obtaining an electrode material made of a carbonaceous-coated electrode active material.

Example 7

An electrode material made of a carbonaceous-coated electrode active material was obtained in the same manner as in Example 6 except for the fact that the neutralization ratio of the carboxyl group of the carboxylic acid-modified polyvinyl alcohol (manufactured by Kuraray Co., Ltd., trade name: KL-318) reached 50 mol %.

Example 8

Li[Fe$_{0.25}$Mn$_{0.75}$]PO$_4$ (electrode active material) (20 g) obtained in Manufacturing Example 4 and, as a carbon source, glucose (0.4 g) and an ammonium carboxylate-based surfactant (manufactured by Toagosei Co., Ltd., trade name: ARON A-6114, 1.2 g) were mixed into water. After that, the components were crushed and mixed using a ball mill together with zirconia balls (150 g) having 5 mm$\phi$, thereby obtaining a slurry (mixture).

Next, the obtained slurry was dried and granulated using a two-fluid nozzle-type spray dryer. After that, the obtained granulated substance was thermally treated at a temperature of 780° C. for four hours, thereby obtaining an electrode material made of a carbonaceous-coated electrode active material.

Comparative Example 1

An electrode active material (20 g) and, as a carbon source, glucose (0.4 g) and ammonium dodecylbenzenesulfonate (0.5 g), for which the reaction temperature and the reaction time of Manufacturing Example 1 were 200° C. and 24 hours, were used, and an electrode active material of Comparative Example 1 was obtained in the same manner as in Example 1 except for the above-described fact.

Comparative Example 2

Lithium phosphate (Li$_3$PO$_4$), manganese (II) sulfate pentahydrate (MnSO$_4$·5H$_2$O), iron (II) sulfate heptahydrate (FeSO$_4$·7H$_2$O), and sodium carboxymethyl cellulose were dissolved in pure water in a nitrogen atmosphere. At this time, the substance amount ratio of the dissolved metals was set to the following ratio.

Li:Fe:Mn=3:0.25:0.75

A solution in which the starting materials were dissolved was put into a pressure-resistant container, the container was sealed, the solution was hydrothermally synthesized at 200° C. for three hours, washed, and then thermally treated at 700° C. for one hour in nitrogen, thereby obtaining an electrode material of Comparative Example 2.

Production of Lithium Ion Batteries

The electrode material obtained in each of the examples and the comparative examples, acetylene black (AB) as a conductive auxiliary agent, and a polyvinylidene fluoride (PVdF) resin as a binder were mixed into N-methylpyrrolidone (NMP) so that the mass ratio (the electrode material/AB/PVdF) therebetween reached 90:5:5, thereby producing positive electrode material paste. The obtained paste was applied and dried on a 30 μm-thick aluminum foil and was pressed so as to obtain a predetermined density, thereby producing an electrode plate.

A plate-like specimen having a coated surface with an area of 3×3 cm$^2$ and an allowance for a tab around the coated surface was obtained from the obtained the electrode plate by means of punching, and the tap was welded, thereby producing a test electrode.

Meanwhile, as a counter electrode, similarly, a coated electrode obtained by applying natural graphite was used. As a separator, a porous polypropylene film was employed. In addition, a lithium hexafluorophosphate (LiPF$_6$) solution (1 mol/L) was used as a non-aqueous electrolyte (a solution of a non-aqueous electrolyte). Meanwhile, as a solvent that was used in the LiPF$_6$ solution, a solvent obtained by mixing ethylene carbonate and ethyl methyl carbonate 3:7 in terms of % by volume and adding vinylene carbonate (2%) thereto as an additive was used.

In addition, laminate-type cells were produced using the test electrode, the counter electrode, and the non-aqueous electrolyte produced in the above-described manner and were used as batteries of the examples and the comparative examples.

Evaluation of Electrode Materials

For the electrode materials obtained in the examples and the comparative examples and the components included in the electrode materials, properties were evaluated. The evaluation methods are as described below. Meanwhile, the results are shown in Tables 1 and 2.

(1) Amount of Carbon in Electrode Material

The amount (% by mass) of carbon in the electrode material was measured using a carbon analyzer (manufactured by Horiba Ltd., carbon/sulfur combustion analyzer EMIA-810W).

(2) Crystallite Diameter of Electrode Active Material

The crystallite diameter of the electrode active material was calculated from the Scherrer's equation using the full width at half maximum of the diffraction peak and the diffraction angle (2θ) of the (020) plane in a powder X-ray diffraction pattern measured using an X-ray diffractometer (product name: RINT2000, manufactured by Rigaku Corporation).

(3) The volume (V) of micropores having a micropore diameter of 200 nm per unit mass and the specific surface area (A: cylinder approximate specific surface area) of the electrode material were measured by a nitrogen adsorption method (B. J. H. method) using a gas adsorption measurement instrument (for example, manufactured by Microtrac-BEL Corp., trade name: BELSORP-II), and 4×V/A was regarded as the average micropore diameter.

Evaluation of Electrodes and Lithium Ion Batteries

Discharge capacities and direct current resistances (DCR) of charging and discharging were measured using the lithium ion batteries obtained in the examples and the comparative examples. The results are shown in Tables 1 and 2.

(1) Discharge Capacity

Discharge capacities were measured at an ambient temperature of 30° C. by means of constant-current charging and discharging with a charge current set to 1 C, a discharge current set to 5 C, and a cut-off voltage set to 2.5 to 4.1 V (vs natural graphite) for the lithium ion batteries of Examples 1 to 5 and Comparative Examples 1 and 2 and to 2.5 to 4.2 V (vs natural graphite) for the lithium ion batteries of Examples 6 to 9.

(2) Direct Current Resistance (DCR) of Charging and Discharging

The lithium ion batteries were charged with a current of 0.1 C at an ambient temperature of 25° C. for five hours, and the depths of charge were adjusted (state of charge (SOC) 50%). DCR of the batteries adjusted to SOC 50% was measured with the ambient temperature set to 0° C. "1 C charging for 10 seconds→10-minute rest→1 C discharging for 10 seconds→10-minute rest" as a first cycle, "3 C charging for 10 seconds→10-minute rest→3 C discharging for 10 seconds→10-minute rest" as a second cycle, "5 C charging for 10 seconds→10-minute rest→5 C discharging for 10 seconds→10-minute rest" as a third cycle, and "10 C charging for 10 seconds→10-minute rest→10 C discharging for 10 seconds→10-minute rest" as a fourth cycle were sequentially carried out, and voltages 10 seconds after the respective charging and discharging during the cycles were measured. Individual current values were plotted along the horizontal axis, and the voltages after 10 seconds were plotted along the vertical axis, thereby drawing approximate straight lines, and the slopes of the approximate straight lines were respectively considered as direct current resistances during charging (charging DCR) and direct current resistances during discharging (discharging DCR).

Summary of results

In the examples, the specific surface area, which was obtained using a nitrogen adsorption method, of the active material was set to 4 $m^2/g$ or more and 40 $m^2/g$ or less, the volume of micropores having a micropore diameter of 200 nm or less per unit mass was set to 0.05 $cm^3/g$ or more and 0.3 $cm^3/g$ or less, and the average micropore diameter, which was obtained from the volume of micropores having a micropore diameter of 200 nm or less per unit mass and the specific surface area, was set to 26 nm or more and 90 nm or less in the electrode materials, whereby fine electrode active material particles coated with a favorable carbonaceous film were obtained, furthermore, the electrode active material particles coming close to one another was suppressed even when spherical granular bodies were obtained by spraying and drying, and electrode materials which were excellent in terms of the electrolyte infiltration properties and the electrolyte holding capability and had appropriate micropores were obtained.

It could be confirmed that, due to the above-described effects, the electron conductivity of the carbonaceous film sufficiently improves, the discharge capacity increases, and the direct current resistance decreases.

In the comparison of the systems in which the active material did not include Mn, that is, Comparative Example 1 and Examples 1 to 4, the electrode material of Comparative Example 1 had a small specific surface area and had coarse particles, and thus the reaction area was small, and the ion diffusivity in the particles was also insufficient. As a result, the discharge capacity decreased, and an increase in the direct current resistance was observed.

In addition, in the comparison of the systems in which the active material included Mn, that is, Comparative Example 2 and Examples 5 to 8, it was confirmed that the electrode material of Comparative Example 2 did not have micropores suitable to the electrolyte infiltration properties and the electrolyte holding capability, and thus the high-speed

TABLE 1

| | Electrode material | Amount of carbon [%] | Specific surface area (A) [$m^2/g$] | Crystallite diameter [nm] | Volume of micropore [$cm^3/g$] | Average micropore diameter [nm] | 5 C discharge capacity [mAh/g] | Charge direct current resistance [Ω] | Discharge direct current resistance [Ω] |
|---|---|---|---|---|---|---|---|---|---|
| Example 1 | LiFePO$_4$ | 1.4 | 13.1 | 76 | 0.180 | 55.0 | 145 | 8.3 | 6.6 |
| Example 2 | LiFePO$_4$ | 1.5 | 16.2 | 74 | 0.162 | 40.0 | 146 | 8.2 | 6.5 |
| Example 3 | LiFePO$_4$ | 1.4 | 16.0 | 75 | 0.145 | 36.3 | 146 | 8.3 | 6.6 |
| Example 4 | LiFePO$_4$ | 1.1 | 10.3 | 105 | 0.122 | 47.4 | 145 | 8.8 | 7.2 |
| Comparative Example 1 | LiFePO$_4$ | 0.6 | 3.7 | 200 or more | 0.040 | 43.2 | 68 | 19.0 | 8.8 |

TABLE 2

| | Electrode material | Amount of carbon [%] | Specific surface area (A) [$m^2/g$] | Crystallite diameter [nm] | Volume of micropore [$cm^3/g$] | Average micropore diameter [nm] | 5 C discharge capacity [mAh/g] | Charge direct current resistance [Ω] | Discharge direct current resistance [Ω] |
|---|---|---|---|---|---|---|---|---|---|
| Example 5 | LiMnPO$_4$ | 3.2 | 29.0 | 50 | 0.240 | 33.1 | 126 | 21.0 | 17.2 |
| Example 6 | Li [Fe$_{0.25}$Mn$_{0.75}$] PO$_4$ | 1.9 | 29.0 | 50 | 0.235 | 32.4 | 132 | 19.0 | 15.2 |
| Example 7 | Li [Fe$_{0.25}$Mn$_{0.75}$] PO$_4$ | 1.8 | 27.0 | 52 | 0.220 | 32.6 | 130 | 19.1 | 15.3 |
| Example 8 | Li [Fe$_{0.25}$Mn$_{0.75}$] PO$_4$ | 1.9 | 28.0 | 51 | 0.226 | 32.3 | 130 | 19.0 | 15.2 |
| Comparative Example 2 | Li [Fe$_{0.25}$Mn$_{0.75}$] PO$_4$ | 1.7 | 23.2 | 80 | 0.061 | 10.5 | 98 | 24.9 | 19.8 | charge and discharge performance was not sufficient, and the direct current resistance also increased.

The electrode material of the present invention is useful for positive electrodes in lithium ion batteries.

What is claimed is:

1. A carbonaceous-coated electrode active material having primary particles of the electrode active material and secondary particles that are aggregates of the primary particles, and
a carbonaceous film that coats the primary particles of the electrode active material and the secondary particles that are the aggregates of the primary particles,
wherein the carbonaceous-coated electrode active material has a specific surface area, which is obtained using a nitrogen adsorption method, being 4 m$^2$/g or more and 40 m$^2$/g or less, and a volume of micropores having a micropore diameter of 200 nm or less per unit mass, which is obtained using the nitrogen adsorption method, is 0.122 cm$^3$/g or more and 0.162 cm$^3$/g or less, and the carbonaceous-coated electrode active material has an average micropore diameter, which is obtained from the volume of the micropores having a micropore diameter of 200 nm or less per unit mass and the specific surface area, being 26 nm or more and 90 nm or less, and
wherein a crystallite diameter of the electrode active material is 30 nm or more and 250 nm or less.

2. The carbonaceous-coated electrode active material according to claim 1, wherein the electrode active material is an electrode active material represented by General Formula (1):

$$Li_aA_xM_yBO_z \tag{1}$$

in the formula,
A represents at least one element selected from the group consisting of Mn, Fe, Co, and Ni,
M represents at least one element selected from the group consisting of Na, K, Mg, Ca, Al, Ga, Ti, V, Cr, Cu, Zn, Y, Zr, Nb, Mo, and rare earth elements,
B represents at least one element selected from the group consisting of B, P, Si, and S, 0≤a<4,
0<x<1.5,
0≤y<1, and
0<z≤4.

3. The carbonaceous-coated electrode active material according to claim 2, wherein the electrode active material represented by General Formula (1) is an electrode active material represented by General Formula (2):

$$Li_aA_xM_yPO_4 \tag{2}$$

in the formula,
A represents at least one element selected from the group consisting of Mn, Fe, Co, and Ni,
M represents at least one element selected from the group consisting of Na, K, Mg, Ca, Al, Ga, Ti, V, Cr, Cu, Zn, Y, Zr, Nb, Mo, and rare earth elements,
0≤a<4, 0<x<1.5, and
0≤y<1.

4. A method for manufacturing the carbonaceous-coated electrode active material according to claim 1, the method comprising:
drying a slurry obtained by mixing an organic substance including sugar and an ionic organic substance as a carbon source, one or more selected from the electrode active material and an electrode active material precursor, and a solvent by using a spray dryer and granulating the slurry to form a granulated substance, wherein the ionic organic substance is alkyl benzene sulfonate; and
thermally treating the granulated substance in a non-oxidative atmosphere at 600° C. or higher and 1,000° C. or lower.

5. An electrode formed using the carbonaceous-coated electrode active material, according to claim 1, as one component of the electrode.

6. A lithium ion battery comprising:
a positive electrode made of the electrode according to claim 5.

* * * * *